UNITED STATES PATENT OFFICE.

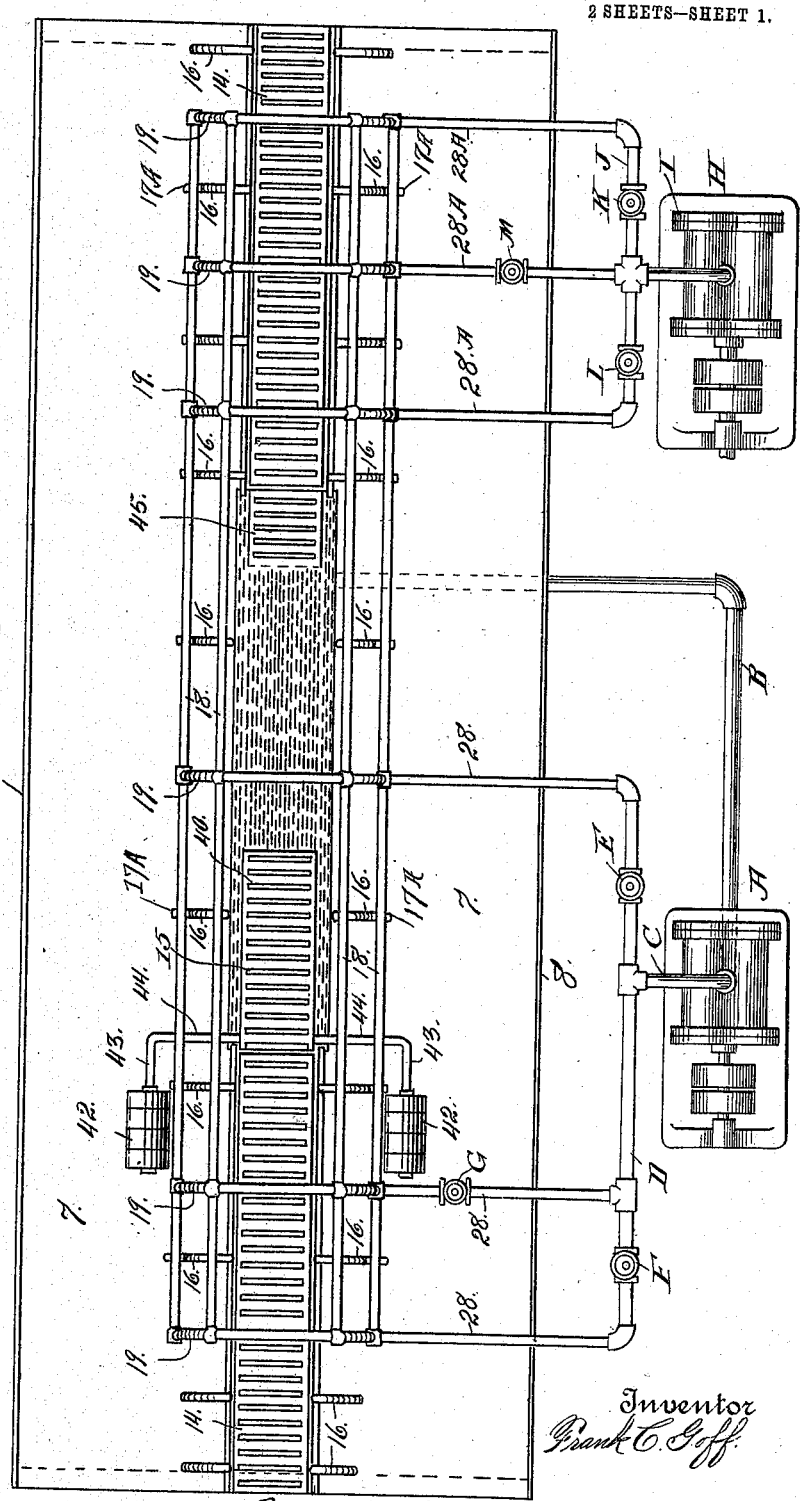

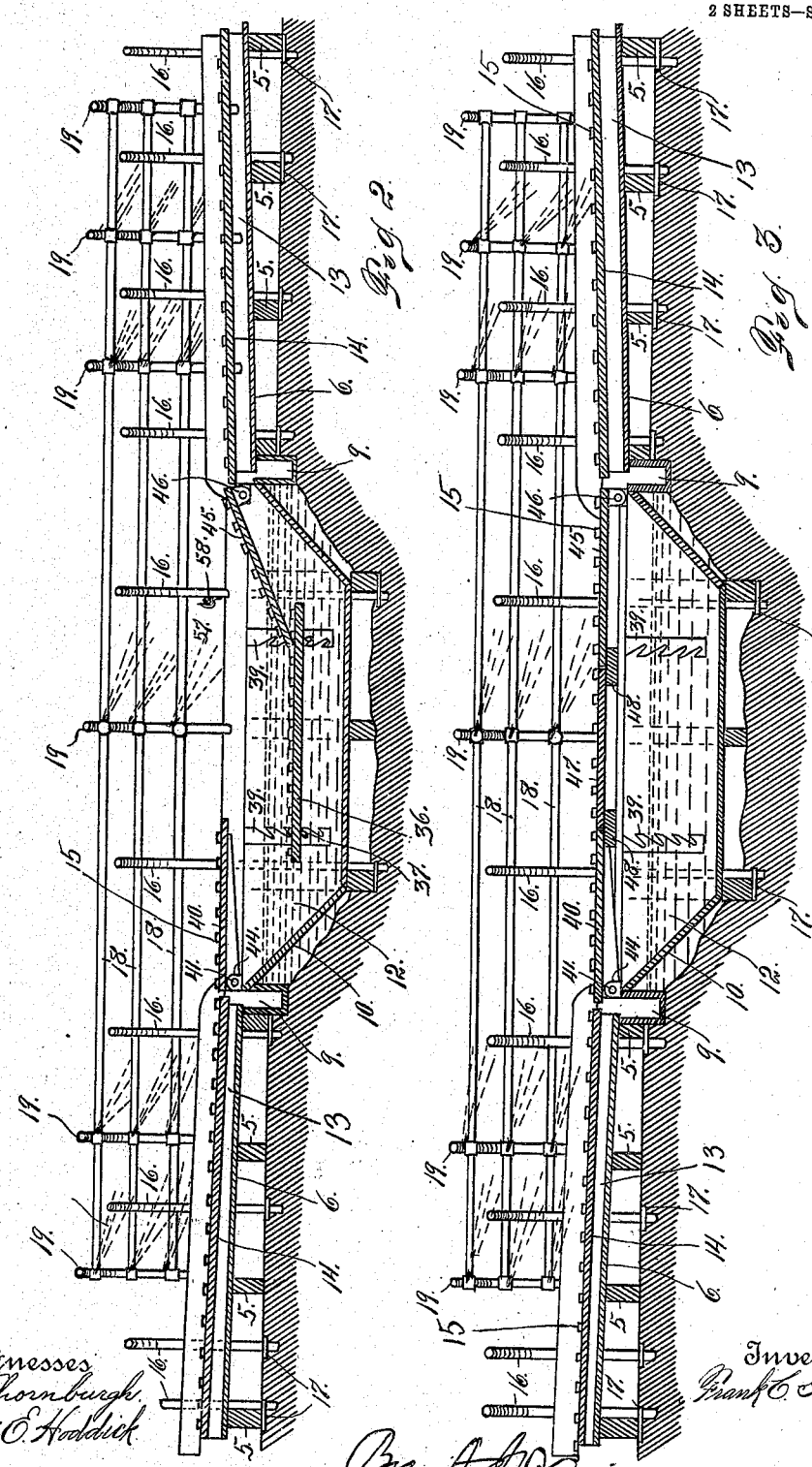

FRANK C. GOFF, OF DENVER, COLORADO.

PROCESS OF TREATING ANIMALS.

No. 885,694.  Specification of Letters Patent.  Patented April 21, 1908.

Original application filed July 16, 1907, Serial No. 384,061. Divided and this application filed November 6, 1907.
Serial No. 401,027.

*To all whom it may concern:*

Be it known that I, FRANK C. GOFF, a citizen of the United States, residing in the city and county of Denver and State of Colorado, have invented a certain new and useful Process of Treating Animals; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.
My invention relates to a process for treating animals for the purpose of killing insects, destroying their eggs or larva and for the purpose of curing skin diseases to which they are liable or subject.
The subject matter of this application is divided out of my previous application Serial No. 384,061, filed July 16th, 1907.

This process consists in the treatment of the animals in the first instance with liquid insecticide and subsequently subjecting them to sprays of air or gas under pressure for the purpose of removing the surplus insecticide. This subsequent treatment also has a tendency to force the insecticide into the pores of the skin whereby its action is more effective. By virtue of subjecting the animals to the action of air or other gas under pressure, the surplus liquid is removed without the necessity of waiting for the insecticide to drip from their bodies which is a comparatively slow process.

The original treatment of the animals by the liquid insecticide, may be either in the form of sprays of the insecticide; by immersion; or by partial immersion and partial spraying as may be desired.

While my present invention is not limited to the use of any particular apparatus, in the accompanying drawing I have illustrated means that may be employed for carrying out the process.

In this drawing, Figure 1 is a top plan view of my improved apparatus. Fig. 2 is a vertical longitudinal section of the same.
Fig. 3 is a similar view showing the centrally located insecticide tank, covered so that the animals may pass through without entering the tank.

The same reference characters indicate the same parts in all the views.

Let the numeral 5 designate suitable sills or transversely located beams, which form a support for bottom plates 6 located at the opposite extremities of the apparatus and inclined downwardly longitudianlly from said extremities. Extending outwardly on opposite sides of these plates 6, are platforms 7 whose outer edges are upturned to form flanges as shown at 8. From these flanges the platforms are downwardly inclined and overlap the plates 6, whereby any liquid which passes beyond the boundaries of the said plates, is returned to the plates and caused to pass downwardly into troughs 9, located at the opposite extremities of the central tank 10 containing the liquid insecticide 12.

Above the plates 6 and resting upon longitudinal sills or beams 13 are located front and rear platforms 14 which are downwardly inclined slightly in the direction of the tank 10. These platforms are provided with transverse ribs 15, to prevent the animals from slipping while passing through the runway.

The beams 5 provide means for the support of stanchions 16 whose extremities as shown in the drawing are provided with plates 17 which are secured to the said beams. These stanchions project upwardly on opposite sides of the platforms 14. They are provided with outwardly projecting brackets 17ᴬ, which form the support for longitudinally disposed bars 18 which support transversely disposed spray pipes or conduits 19 which extend over the runway or space between the stanchions. The three spray pipes 19 farther to the left in Fig. 1 are supplied with liquid insecticide by supply conduits 28 which may be connected with a pump A (see Fig. 1) or any suitable source of supply. This pump receives the liquid insecticide from a conduit B and delivers it through a pipe C to a pipe D with which all of the pipes 28 communicate. The pipe D is provided with cut-off valves E and F for regulating the supply of the liquid insecticide to two of the pipes 28 while the third pipe 28 is provided with a valve G for the same purpose. The three spray pipes farther to the right in Fig. 1 are supplied with air or gas by pipes 28ᴬ which may be connected with an air pump H (see Fig. 1) or other suitable source of air supply. This pump delivers air under pressure through a pipe I to a pipe J with which all of the three pipes 28ᴬ communicate. The pipe J is supplied with valves K and L for regulating the supply of air to two of the pipes 28ᴬ, the third pipe 28ᴬ being provided with a valve M for the same purpose.

Within the tank 10, is located a vertically adjustable platform 36, the height of which as shown in the drawing, may be regulated by placing supporting bars or rods 37, in different positions in the notched or recessed hangers 39 located at the opposite sides of the tank. By virtue of the adjustability of this platform, the depth of liquid through which the animals are caused to wade, may be regulated at will to correspond with the height of the animal. This platform 36 is also provided with transverse ribs 15 the same as the platforms 14.

Mounted above the forward end of the tank 10, is an auxiliary platform 40 normally supported in the plane of the adjacent platform 14, by weights 42 respectively connected with crank arms 43 formed on the opposite extremities of a rock shaft 44 to which the platform 40 is made fast, the said shaft being journaled in the sides of the tank 10 whereby the said platform is hinged to move downwardly with the weight of the animal, the weights 42 being so adjusted as to bring about this result. For this purpose each weight 42 is composed of any desired number of readily detachable and replaceable sections. This hinged platform is an important feature, since by virtue thereof, the animal will readily walk thereon and move downwardly by his own weight into the liquid of the tank; whereas if it were not for the platform, much difficulty might be experienced in causing the animal to walk unassisted into the tank. As the platform moves downwardly, to the inclined position, the animal will pass immediately to the adjustable platform member 36, and then pass on to a second inclined platform 45 hinged to the tank as shown at 46. The inner extremity of this last named platform normally rests upon the platform member 36.

When it is not desired to partially immerse the animals in the liquid of the tank 10, the two hinged platforms 40 and 45, may be raised to the position shown in Fig. 3, and an intermediate platform member 47 placed in position and supported by suitable cross pieces 48 resting upon the opposite sides of the tank. By virtue of this last named construction, the animals walk over or above the liquid in the tank and they are treated by the fluid jets from the spray nozzles alone.

From the foregoing description the manner of practicing my improved process will be readily understood. For the purposes of this description it will be assumed that the animals enter the runway at the left referring to Figs. 1 to 3 of the drawing. Assuming that they are traveling along the runway upon the front platform 14 or that at the extreme left of the views of the drawing, they may be subjected to the action of sprays 4 of liquid insecticide, issuing from the spray pipes 19, and this operation may be continued until they reach the platform 14 at the right of the drawing, assuming that the apparatus is arranged as shown in Fig. 3, whereby the liquid-containing tank is covered; after which they may be subjected to the action of air sprays while passing over the platform 14 at the extreme right, whereby the surplus liquid is removed and the remaining liquid thoroughly spread over the hides of the animals and caused to penetrate the pores of the skin. Hence by the time the animal passes out of the runway at the extreme right the surplus liquid has been entirely removed thus obviating the necessity of retaining him for dripping purposes.

When the form of construction shown in Fig. 2 is employed, the animals may be first sprayed in the manner just explained, upon the platform 14 and subsequently partially immersed in the liquid 12 of the tank 10. In this event the lower portions of the bodies of the animals would be immersed while the upper portions are subjected to the liquid sprays, after which the animals travel out of the tank and are subjected to air or gas sprays on the platform 14 at the extreme right in the same manner as just explained.

If desired the original treatment of the animals by the liquid may be total immersion in the tank 10 and after they are removed from the tank they may be subjected to the air sprays on the platform 14 at the right in the same manner and for the purpose heretofore stated.

Having thus described my invention, what I claim is:

1. A process for the treatment of live stock, consisting first in subjecting the animals to the action of liquid and subsequently subjecting them to the action of gas under pressure.

2. A process for the treatment of live stock, consisting first in subjecting the animals to liquid sprays, and subsequently subjecting them to air sprays.

3. A process for the treatment of live stock, consisting first in subjecting the animals to the action of a liquid insecticide and subsequently to the action of sprays of gas.

4. A process for the treatment of live stock consisting first in subjecting the animals to the action of a liquid insecticide, and subsequently subjecting them to the action of air under pressure for the purpose set forth.

5. A process for the treatment of live stock, consisting first in subjecting the animals to the action of a liquid insecticide delivered in the form of sprays, and finally subjecting them to the action of sprays of air.

In testimony whereof I affix my signature in presence of two witnesses.

FRANK C. GOFF.

Witnesses:
DENA NELSON,
JESSIE HOBART.